United States Patent [19]

Beuchel et al.

[11] Patent Number: 4,814,137
[45] Date of Patent: Mar. 21, 1989

[54] HIGH PERFORMANCE RELIABILITY FUEL PELLET

[75] Inventors: Peter H. Beuchel; Yu C. Lee, both of Columbia, S.C.

[73] Assignee: Westinghouse Electric Corp., Pittsburgh, Pa.

[21] Appl. No.: 156,110

[22] Filed: Feb. 16, 1988

[51] Int. Cl.4 .................................................. G21C 3/30
[52] U.S. Cl. .................................... 376/429; 376/431; 376/903
[58] Field of Search ......................... 376/429, 431, 903

[56] References Cited

U.S. PATENT DOCUMENTS

| | | | |
|---|---|---|---|
| 3,192,621 | 7/1965 | Bauer et al. | 29/510 |
| 3,230,152 | 1/1966 | Kerze, Jr. | 376/429 |
| 3,415,911 | 12/1968 | Lloyd | 264/0.5 |
| 3,801,451 | 4/1974 | Scharf | 376/429 |
| 4,120,752 | 10/1978 | Ocken | 376/429 |
| 4,129,477 | 12/1978 | Johansson | 376/429 |
| 4,175,002 | 11/1979 | Wada | 376/429 |
| 4,282,064 | 8/1981 | Hayashi | 376/429 |
| 4,636,352 | 1/1987 | Boyle | 376/419 |

Primary Examiner—Donald P. Walsh

[57] ABSTRACT

A fuel pellet for a nuclear reactor fuel rod is fabricated with smooth and gently sloping surfaces having no sharp edges or areas of high stress concentration. The bearing surfaces of the fuel pellets are contoured so that the pellets are easily stacked within a fuel rod and permit pivoting action between the fuel pellets. The fuel pellets are stacked end to end in a fuel rod which is incorporated into a fuel assembly for a nuclear reactor.

26 Claims, 2 Drawing Sheets

HIGH PERFORMANCE RELIABILITY FUEL PELLET

BACKGROUND OF THE INVENTION

1. Field of the Invention

The present invention relates to fuel pellets for nuclear reactors, and particularly fuel pellets configured to minimize pellet chipping and cracking and to protect the integrity of fuel rods in which they are housed.

2. Related Art

Conventional nuclear fuel pellets are fabricated by compressing suitable powders into a generally cylindrical mold. The compressed material is then sintered, resulting in a substantial reduction in volume. The resulting pellet is generally cylindrical and often has concave surfaces at each end as a result of the compression.

The cylindrical fuel pellets are easily chipped, particularly at the rim, when fuel rods in which they are housed are subjected to normal flexing during handling or vibrational flexing resulting from coolant flow. The dislodged fuel pellet chips produce localized hot spots in the fuel rod which are often responsible for local fuel rod cladding failure. When the fuel rod cladding fails, radioactive gases and materials contained in the released fission gas are released into both the coolant and the atmosphere.

U.S. Pat. No. 4,120,752 to Ocken discloses a mixed oxide fuel pellet. It has been found that large agglomerates of $PuO_2$ in the vicinity of the outer surface of the fuel pellet result in local hot spots in the cladding. In order to prevent localized melting and perforation of the cladding due to the $PuO_2$ agglomerates, a fuel pellet is fabricated from a generally cylindrical pellet of $PuO_2$ surrounded by an annular $UO_2$ casing. The outer $UO_2$ casing is free of $PuO_2$ so as to avoid localized melting and perforation of the fuel rod cladding due to the $PuO_2$ agglomerates. This structure does not solve the problem of fuel pellet chipping and cracking occasioned as a result of forces acting on the pellet during vibrational flexing. The sharp edges of the generally cylindrical shape of the pellet are known to be subjected to various types of loading conditions which are particularly vulnerable to chipping and cracking. The $UO_2$ annular casing does not mitigate this problem.

U.S. Pat. No. 3,415,911 to Lloyd discloses generally cylindrical pellets inserted into a tubular fuel rod for use in a nuclear reactor. In order to achieve intimate contact between the fuel pellet and the fuel rod cladding, the stacked fuel rods are subjected to ultrasonic vibration or thermal shock in order to crack the fuel pellets contained in the fuel rod. By cracking the fuel pellets, the cross-sectional dimensions of the fuel pellet bodies are increased relative to the fuel rod cladding, thereby achieving more intimate contact between the fuel pellets and the fuel rod.

U.S. Pat. No. 3,192,621 to Bauer et al discloses cylindrical fuel pellets having arcuate "rebates" which form annular channels when the pellets are stacked on top of one another. The annular channel provides an area into which the fuel cladding may expand. The arcuate rebates formed in the cylindrical pellets, however, increase the number of sharp edges on each individual pellet. Therefore, there is a greater possibility of fuel pellet chipping and cracking.

SUMMARY OF THE INVENTION

It is an object of the present invention to provide a fuel pellet which resists chipping and cracking.

It is also an object of the present invention to provide a fuel pellet which may be easily packed into a fuel rod with a low failure rate during fabrication. It is yet another objection of the present invention to provide a fuel rod which is free from local cladding failures due to localized hot spots.

It is yet another object of the invention to provide a fuel assembly with a long service lifetime due to the high integrity of the fuel rods and fuel pellets contained therein.

Additional objects, advantages, and novel features of the invention will be set forth in part in the description which follows and in part will become apparent to those skilled in the art upon the examination of the following or may be learned by practice of the invention.

To achieve the foregoing and other objects and in accordance with the purpose of the invention, as embodied and broadly described herein, there is provided a fuel pellet comprising a substantially cylindrical central section. A convex first end section is joined to the central section by a smooth and continuous curved surface. A concave second end section is also joined to the central section by a smooth and continuous curved surface. The concave end section has a curvature approximately equal to that of the convex end section. In a preferred embodiment, the fuel pellet is provided with dishes to absorb expansion of the pellet and is also provided with fission gas venting paths for venting released fission gas.

BRIEF DESCRIPTION OF THE DRAWINGS

These and other features and advantages of the subject invention will be most readily understood from the following description, read in conjunction with the drawings, in which.

DETAILED DESCRIPTION OF THE PREFERRED EMBODIMENTS

Reference will now be made in detail to the presently preferred embodiments of the invention, examples of which are illustrated in the accompanying drawings.

Figure 1:
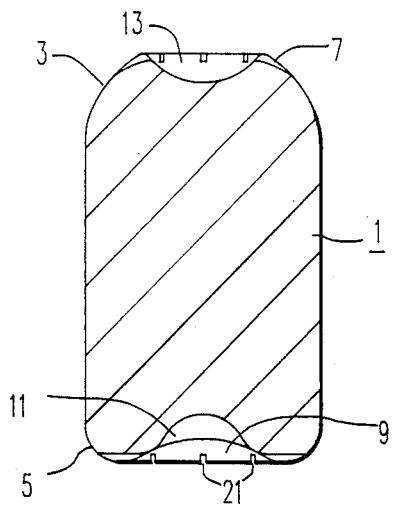
FIG. 1 is a cross-sectional view of nuclear reactor fuel pellet according to the present invention.

In fabricating a fuel pellet, such as that shown in FIG. 1, it is desired to select a contour which can be easily loaded into a tubular fuel rod, while at the same time providing a contour which minimizes sharp increases in mechanical stress. By minimizing sharp stress zones, the fuel pellet will be able to withstand chipping and cracking which generally results from excessive forces concentrating in these areas. It is also desired to select a shape which provides efficient space utilization when stacked into a tubular fuel rod.

FIG. 1 shows the preferred embodiment of a nuclear reactor fuel pellet generally indicated by the numeral 10. The fuel pellet 10 shown in FIG. 1 comprises a generally cylindrical central section 1 which has a pair of bearing sections 3 and 5. Each of the bearing sections 3 and 5 have bearing surfaces 7 and 9 which are placed in intimate contact with adjacent fuel pellets when stacked inside of a fuel rod.

The pellets are provided with depressions 11 and 13 referred to herein as "dishes". The dishes are provided in the bearing sections 3 and 5 in order to permit axial thermal expansion of the fuel pellet. These dishes also accommodate fuel volumetric growth during burn up.

The contour of the fuel pellet 10 shown in FIG. 1 is of particular importance. The central section 1 is joined to each of the respective bearing sections 3 and 5 by a smooth and continuous curved surface. In other words, the curvature of the junction between the central section 1 and the bearing sections 3 and 5 is chosen so as to preclude any sharp angles, bends, or ridges in the contour of the pellet. Likewise the bearing surfaces 7 and 9 are configured to smoothly flow into the respective depressions 11 and 13 without sharp angles or ridges.

By providing the smoothly curved surface as illustrated, sharp edges, known to be areas of increased stress concentration, are substantially eliminated. This reduces fuel pellet chipping, and cracking, thereby significantly enhancing the service lifetime of the fuel pellet.

The bearing surfaces 7 and 9 illustrated in FIG. 1 have substantially the same curvature so that the lower bearing surface 9 of the pellet is able to accommodate upper bearing surface 7 of an adjacent fuel pellet. Likewise, the upper bearing surface 7 is easily accommodated in the lower bearing surface 9 of an adjacent fuel pellet. The thus conformed surfaces provide an optimal contact relationship between the adjacent pellets which reduces pellet cracking resulting from fuel rod flexing during handling and during vibration resulting from coolant flow.

Figure 2:
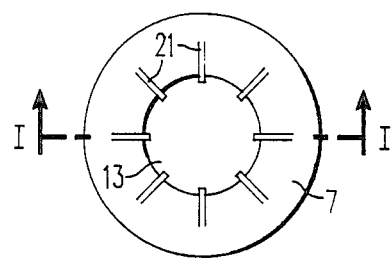
FIG. 2 is a top end view of the fuel pellet illustrated in FIG. 1.

FIG. 2 illustrates a top end view of the fuel pellet illustrated in FIG. 1. The bearing surface 7 is provided with a plurality of fission gas communication paths 21. The fission gas communication paths 21 comprise shallow fillet-shaped grooves integrally formed in the bearing surface 7 of the fuel pellet. Identical grooves are also formed on the lower bearing surface 9. These paths prevent accumulation of the gases generated during burn up in the pellet dishes chambers by allowing the gases from the depressions 11 and 13 to vent into the space between the fuel pellets and the fuel rod cladding. The binding of two pellets may result in a non-uniform pellet deformation and hour glass pellet shape.

Figure 3:
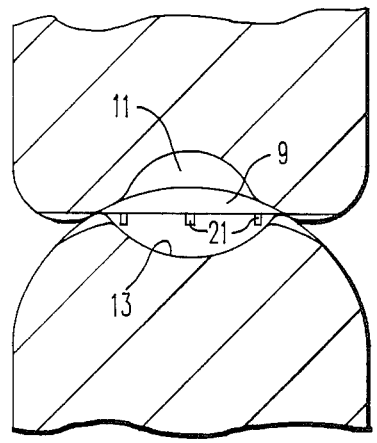
FIG. 3 is a cross-sectional view of two stacked fuel pellets according to the present invention.

FIG. 3 illustrates a pair of fuel pellets according to FIG. 1 in a stacked configuration. The upper bearing surface 7 of the lower pellet conforms to the lower bearing surface 9 of the upper fuel pellet so that the stacked pellets are in intimate contact. The conformed bearing surfaces 7 and 9 minimize pellet cracking due to fuel rod flexing during handling and fuel rod vibration under fluid flow conditions.

Figure 4:
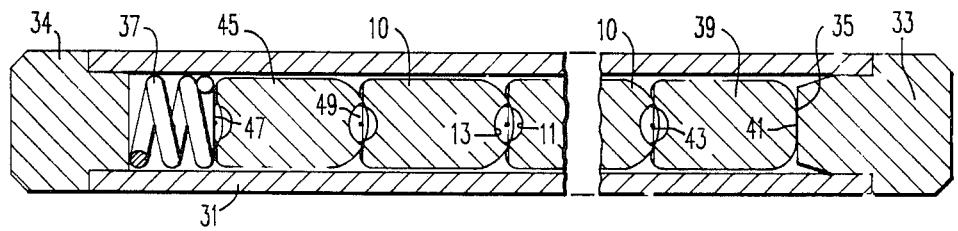
FIG. 4 is a cross-sectional view of a first embodiment of a fuel rod according to the present invention.

FIG. 4 illustrates a fuel rod for use in a fuel assembly of a nuclear reactor. The fuel comprises a cladding 31 which may be fabricated from metal zirconium or an alloy thereof, or any other suitable material. The fuel rod is provided with an end plug 33 at one end. A spring 37 is provided at another end of the fuel rod in order to properly position the fuel pellets stacked inside of the rod.

It is desired to obtain close contact between the fuel pellets and the surrounding cladding 31. At the same time, however, it is necessary to maintain an annular gap between the fuel pellets and the cladding 31 in order to provide for thermal expansion of the pellets, as well as the cladding 31, and also in order to permit the pellets to be easily loaded into the fuel rod. Due to the inclusion of the dishes 11 and 13 within the fuel pellets, it is possible to employ a gap value smaller than would otherwise be practical, as the dishes 11 and 13 adequately accommodate a significant volume of the fuel pellet thermal expansion.

As can be seen from the figure, a fuel rod contains a plurality of interior fuel pellets 10 substantially as illustrated in FIG. 1, as well as terminal fuel pellets 39 and 45. The terminal fuel pellet 39 is designed so that its lower bearing surface 43 is identical to the lower bearing surface 9 of the fuel pellet of FIG. 1. The upper bearing surface 41, however, is conformed to the bearing surface 35 of the end plug 33. Another terminal pellet 45 is provided immediately adjacent to the spring 37. Terminal pellet 35 has a bearing surface 49 which is identical to the upper bearing surface 7 of the fuel pellets shown in FIG. 1. The lower bearing surface 47, however, is substantially planar and is designed to accommodate the end portion of the spring 37. A second end plug 34 is positioned at the opposite end of spring 37.

Although not illustrated, it is possible to provide a spacer between the respective terminal fuel pellets and the end plug 33 and spring 37. The spacer may be provided with a bearing surface conformed as discussed in connection with the terminal end pellets.

Figure 5:
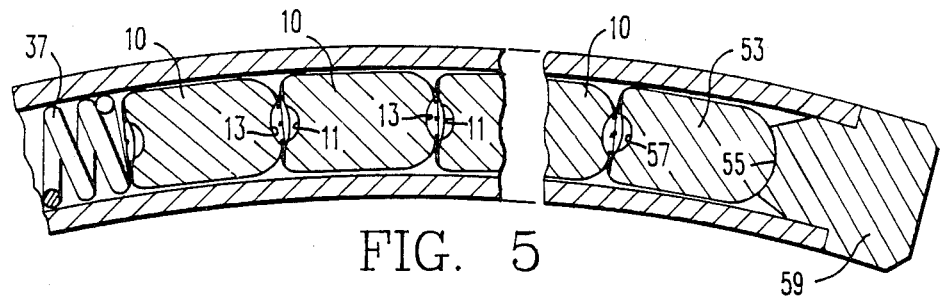
FIG. 5 is a cross-sectional view of a second embodiment of a fuel rod according to the present invention.

FIG. 5 illustrates a fuel rod as it is subjected to flexing which may be occasioned during handling or vibration resulting from coolant flow conditions. The optimal contour of the bearing surfaces 7 and 9 of the fuel pellets permits a pivoting action between pellets. The pivoting action facilitates fuel rod fabrication and reduces the reject rate of manufactured fuel rods. In FIG. 5, the terminal fuel pellet 53 is provided with a contour substantially similar to that of the standard interior fuel pellets 10. However, the bearing surface 55 of the terminal fuel pellet 53 is conformed to the bearing surface 57 of the end plug 59. The fuel pellet immediately adjacent the spring 37 is, in this case, an interior fuel pellet. The spring 37 is provided in the central cavity of the fuel rod in order to exert a downward force on the pellets. This force maintains the pellets in place during pre-irradiation handling of the fuel bundle as well as during vibrational flexing during reactor operation.

Figure 6:
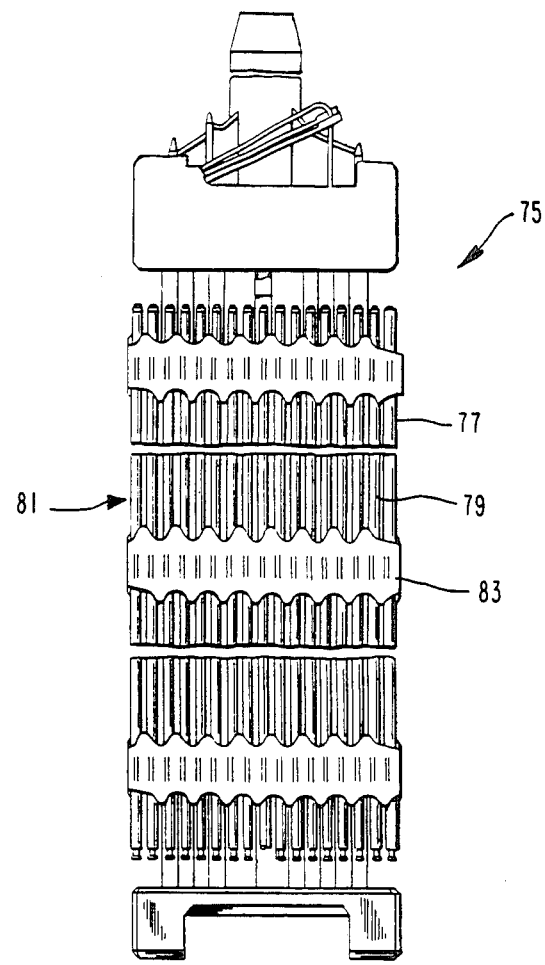
FIG. 6 is a fuel assembly according to the present invention.

FIG. 6 illustrates a fuel assembly 75 incorporating the fuel rods according to the present invention. A plurality of fuel rods 77 and control rods 79 are joined together into a fuel bundle 81. The fuel rods may be in accordance with those described in connection with FIGS. 1–5. The control rods 79 control the overall reactor power level and provide the principal means of quickly and safely shutting down the reactor in a conventional manner. A plurality of spacer grids 83 made of Zircaloy or other suitable material are welded at staggered axial positions to the control rods 79.

The present invention has been described above in a number of embodiments. These embodiments have been described in detail merely to provide an understanding of the invention. The invention itself, however, transcends these particular embodiments, so that many departures from, and modifications to those embodiments are possible without departing from the scope of the invention. The invention should therefore not be regarded as limited to the foregoing embodiments, but instead should be regarded as fully commensurate in scope with the following claims.

We claim:

1. A fuel pellet for a nuclear reactor fuel rod comprising:
   a substantially cylindrical central section;
   a convex first end section smoothly joined to one axial end of said central section at a first junction, said first junction approximating a smooth and continuous curved surface;
   a concave second end section joined to said central section at a second junction, said second junction approximating a smooth and continuous curved surface, wherein the curvature of said concave second end section is conformed to the curvature of said convex first end section.

2. The fuel pellet according to claim 1, further comprising first and second depression means disposed in said first and second end sections for absorbing expansion of said fuel pellet.

3. The fuel pellet according to claim 1, further comprising a plurality of fission gas venting paths disposed radially along each of said first and second end sections.

4. The fuel pellet according to claim 3, wherein said fission gas venting paths comprise shallow fillet-shaped grooves integrally formed in said first and second end sections.

5. A fuel rod for a nuclear reactor comprising:
   a tubular cladding jacket means for accommodating a plurality of fuel pellets;
   a plurality of interior fuel pellets disposed in said cladding jacket, said fuel pellets each comprising:
      a substantially cylindrical interior pellet central section;
      a convex interior pellet first end section joined to said interior pellet central section at a first junction, said first junction approximating a smooth and continuous curved surface;
      a concave interior pellet second end section joined to said interior pellet central section, said second junction approximating a smooth and continuous curved surface, the curvature of said interior pellet second end section being conformed to the curvature of said interior pellet first end section;
   an end plug means, disposed at a first end of said cladding jacket means, for retaining said interior fuel pellets within said cladding jacket means;
   a spring means, disposed at a second end of said cladding jacket means, for positioning said interior fuel pellets; and
   a second end plug means, disposed at said second end of said cladding jacket means, for retaining said interior fuel pellets within said cladding jacket means.

6. A fuel rod according to claim 5, wherein said first end plug means includes a bearing surface and wherein the fuel rod further comprises a first terminal fuel pellet disposed immediately adjacent said first end plug means bearing surface, said first terminal fuel pellet comprising:
   a substantially cylindrical first terminal pellet central section;
   a first terminal pellet bearing section joined to said first terminal pellet central section at a first junction, said first junction approximating a smooth and continuous curved surface, wherein the curvature of said first terminal pellet bearing section conforms to the curvature of said end plug means bearing surface; and
   a first terminal pellet concave end section joined to said first terminal pellet central section at a second junction, said second junction approximating a smooth and continuous curved surface, wherein the curvature of said first terminal pellet concave end section conforms to the curvature of said interior pellet convex end section.

7. The fuel rod according to claim 6, wherein said first end plug means bearing surface and said first terminal pellet bearing section are substantially planar.

8. The fuel rod according to claim 6, wherein said first end plug means bearing surface is concave and said first terminal pellet bearing section is convex; and
   wherein the curvature of said first terminal pellet bearing section conforms to the curvature of said first end plug means bearing surface such that said first terminal pellet bearing section is securely accommodated in said first end plug means.

9. A fuel rod according to claim 6, further comprising a second terminal fuel pellet disposed immediately adjacent said spring means, said second terminal fuel pellet comprising:
   a substantially cylindrical second terminal pellet central section;
   a second terminal pellet bearing section joined to said second terminal pellet central section at a first junction, said first junction approximating a smooth and continuous curved surface, and wherein said second terminal pellet bearing section has a substantially planar surface adapted to accommodate an end portion of said spring means; and
   a second terminal pellet convex end section joined to said second terminal pellet central section at a second junction, said second junction approximating a smooth and continuous curved surface, wherein the curvature of said second terminal pellet convex section conforms to the curvature of said interior pellet concave end section.

10. A fuel rod according to claim 9, wherein said first terminal pellet concave end section and said second terminal pellet convex end section each further comprise a depression means for absorbing thermal expansion of said first and second terminal pellets, respectively.

11. A fuel rod according to claim 5, further comprising a terminal fuel pellet disposed immediately adjacent said spring means, said terminal fuel pellet comprising:
   a substantially cylindrical terminal pellet central section;
   a terminal pellet bearing section joined to said terminal pellet central section at a first junction, said first junction approximating a smooth and continuous curved surface, and wherein said terminal pellet bearing section has a substantially planar surface adapted to accommodate an end portion of said spring means; and
   a terminal pellet convex end section joined to said terminal pellet central section at a second junction, said second junction approximating a smooth and continuous curved surface, wherein the curvature of said terminal pellet convex end section conforms to the curvature of said interior pellet concave end section.

12. A fuel rod according to claim 5, wherein each of said interior pellets further comprise first and second depression means, disposed in said first and second interior pellet end sections, for absorbing thermal expansion of said interior fuel pellets.

13. The fuel rod according to claim 5, wherein each of said interior fuel pellet further comprise a plurality of fission gas venting paths disposed radially along each of said first and second interior fuel pellet end sections.

14. The fuel pellet according to claim 13, wherein said fission gas venting paths comprise shallow fillet-shaped grooves integrally formed in said interior fuel pellet first and second end sections.

15. A fuel assembly for a nuclear reactor comprising:
a bundle comprising a plurality of generally cylindrical fuel rods each comprising a cladding and a plurality of control rods;
a plurality of spacer grid means for retaining said bundle, said spacer grid means each being axially displaced from one another along a longitudinal extent of said bundle;
a plurality of interior fuel pellets stacked end-to-end within each of said fuel rods, each of said interior fuel pellets comprising:
a substantially cylindrical central section;
a convex first end section joined to said central section at a first junction, said first junction approximating a smooth and continuous curved surface;
a concave second end section joined to said central section at a second junction, said second junction approximating a smooth and continuous curved surface, wherein the curvature of said concave second end section is adapted to accommodate an adjacent fuel pellet convex first end section.

16. A fuel assembly for a nuclear reactor according to claim 15, wherein each of said fuel rods further comprise:
an end plug means, having a bearing surface, for retaining said interior fuel pellets in said fuel rod;
a spring means for positioning said interior fuel pellets in said fuel rod; and
a first terminal fuel pellet disposed contiguously to said end plug including:
a substantially cylindrical first terminal pellet central section;
a first terminal pellet bearing section joined to said first terminal pellet central section at a first junction, said first junction approximating a smooth and continuous curved surface, wherein the curvature of said first terminal pellet bearing section conforms to the shape of said end plug bearing surface.

17. A fuel assembly for a nuclear reactor according to claim 16, wherein each of said fuel rods further comprise a second terminal pellet disposed contiguously to said spring means and comprising:
a substantially cylindrical second terminal pellet central section;
a second terminal pellet bearing section joined to said second terminal pellet central section at a first junction, said second terminal pellet bearing section having a substantially planar surface adapted to accommodate an end portion of said spring means; and
a second terminal pellet convex end section joined to said second terminal pellet central section at a second junction;
wherein the curvature of said second terminal pellet convex section is formed so as to securely accommodate an interior pellet concave end section.

18. A fuel assembly for a nuclear reactor according to claim 17, wherein said first and second terminal pellet bearing sections are joined to said first and second terminal pellet central sections, respectively, at junctions which approximate a smooth and continuous curved surface.

19. A fuel assembly for a nuclear reactor according to claim 17, wherein each of said interior pellets further comprise depression means for absorbing expansion of said interior pellets.

20. A fuel assembly for a nuclear reactor according to claim 15, wherein each of said interior pellets further comprise depression means for absorbing expansion of said interior pellets.

21. A fuel assembly for a nuclear reactor according to claim 15, wherein each of said interior pellets further comprise a plurality of fission gas venting paths disposed radially along each of said first and second interior pellet end sections.

22. The fuel assembly according to claim 21, wherein said fission gas venting paths comprise shallow fillet-shaped grooves integrally formed in said first and second interior pellet end sections.

23. A fuel pellet for a nuclear reactor fuel rod assembly, the pellet having a substantially cylindrical longitudinal outer surface terminating at one end in an axially symmetric convex end surface and at the other end in an axially symmetric concave end surface, the end surfaces joining smoothly with the longitudinal surface, and at least a peripheral section of the convex end surface being congruent to a peripheral section of the concave end surface.

24. The fuel pellet according to claim 23, further comprising depression means disposed in each of said convex and concave end surfaces.

25. The fuel pellet according to claim 23, further comprising a plurality of fission gas venting paths disposed radially along each of said convex and concave end surfaces.

26. The fuel pellet according to claim 25, wherein said fission gas venting paths comprise shallow fillet-shaped grooves integrally formed in said convex and concave end surfaces.

* * * * *